United States Patent
Dai et al.

(10) Patent No.: US 9,713,132 B2
(45) Date of Patent: Jul. 18, 2017

(54) METHOD AND SYSTEM FOR PROCESSING DOWNLINK CONTROL INFORMATION

(75) Inventors: Bo Dai, Shenzhen (CN); Yijian Chen, Shenzhen (CN); Xin Wu, Shenzhen (CN); Ruyue Li, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 782 days.

(21) Appl. No.: 14/357,537

(22) PCT Filed: Dec. 13, 2011

(86) PCT No.: PCT/CN2011/083890
§ 371 (c)(1),
(2), (4) Date: Jul. 25, 2014

(87) PCT Pub. No.: WO2012/142840
PCT Pub. Date: Oct. 26, 2012

(65) Prior Publication Data
US 2014/0376422 A1    Dec. 25, 2014

(30) Foreign Application Priority Data

Apr. 22, 2011 (CN) .......................... 2011 1 0102805

(51) Int. Cl.
*H04W 72/04* (2009.01)
*H04L 5/14* (2006.01)
*H04L 5/00* (2006.01)

(52) U.S. Cl.
CPC ......... *H04W 72/042* (2013.01); *H04L 5/0053* (2013.01); *H04L 5/0082* (2013.01); *H04L 5/14* (2013.01); *H04L 5/001* (2013.01); *H04L 5/0023* (2013.01); *H04L 5/0035* (2013.01); *H04W 72/0446* (2013.01)

(58) Field of Classification Search
None
See application file for complete search history.

(56) References Cited

U.S. PATENT DOCUMENTS 8,942,192 B2* 1/2015 Damnjanovic ....... H04W 72/04
                                                        370/329
9,083,494 B2* 7/2015 Zhang ................... H04L 5/0007
(Continued)

FOREIGN PATENT DOCUMENTS

CN       101414870 A      4/2009
CN       101505498 A      8/2009
(Continued)

OTHER PUBLICATIONS

3GPP TS 36.211 V10.0.0, Jan. 10, 2011.
(Continued)

*Primary Examiner* — Donald Mills
(74) *Attorney, Agent, or Firm* — Oppedahl Patent Law Firm LLC

(57) ABSTRACT

A method and a system for processing downlink control information are disclosed, in which downlink control information for the subframe n may be transmitted in a subframe n or the downlink control information for the subframe n may be transmitted in a subframe n−1. By means of technology for processing control channel information provided by the disclosure, a region where the downlink control information is transmitted is added, and space division technology can be fully utilized, so that a load of a Physical Downlink Control Channel (PDCCH) is reduced, the interference between control channels is reduced, and the capacity of the control channel is enlarged.

16 Claims, 6 Drawing Sheets

(56) References Cited

U.S. PATENT DOCUMENTS

| | | | |
|---|---|---|---|
| 9,226,288 B2* | 12/2015 | Barbieri | H04W 72/0426 |
| 9,277,566 B2* | 3/2016 | Wei | H04W 72/1289 |
| 2010/0265870 A1* | 10/2010 | Cai | H04B 7/155 |
| | | | 370/312 |
| 2011/0064061 A1 | 3/2011 | Takeuchi | |
| 2012/0039279 A1* | 2/2012 | Chen | H04L 1/1861 |
| | | | 370/329 |
| 2012/0207099 A1* | 8/2012 | Lindh | H04L 5/0057 |
| | | | 370/329 |
| 2012/0250604 A1* | 10/2012 | Lindholm | H04W 84/047 |
| | | | 370/315 |

FOREIGN PATENT DOCUMENTS

| | | | | |
|---|---|---|---|---|
| CN | 101610564 A | | 12/2009 | |
| CN | 101877621 A | | 11/2010 | |
| CN | 102025472 A | | 4/2011 | |
| CN | 102158978 A | | 8/2011 | |
| JP | WO 2010125798 A1 * | | 11/2010 | H04B 7/15521 |

OTHER PUBLICATIONS

International Search Report in international application No. PCT/CN2011/083890, mailed on Mar. 22, 2012.

English Translation of the Written Opinion of the International Search Authority in international application No. PCT/CN2011/083890, mailed on Mar. 22, 2012.

* cited by examiner

Downlink control information for the subframe n

METHOD AND SYSTEM FOR PROCESSING DOWNLINK CONTROL INFORMATION

TECHNICAL FIELD

The disclosure relates to the field of communications, and in particular to a method and a system for processing downlink control information.

BACKGROUND

There are two kinds of frame structures in a Long Term Evolution (LTE) system. The frame structure Type 1 is applicable to full-duplex Frequency Division Duplexing (FDD) and half-duplex FDD. A radio frame has a length of 10 ms, and is composed of 20 time slots, each of which has a length of 0.5 ms and which are numbered from 0 to 19 respectively. FIG. 1 is a schematic diagram of a frame structure of an FDD mode. As shown in FIG. 1, one subframe is composed of two consecutive time slots. For example, the subframe i is composed of two consecutive time slots 2i and 2i+1. Regardless of the half-duplex FDD or the full-duplex FDD, both of uplink and downlink are transmitted at different frequencies. However, in half-duplex FDD, a User Equipment (UE) cannot transmit and receive data at the same time, whereas in full-duplex FDD, there is no restriction to this, i.e., for a UE, data can be received on 10 downlink subframes and transmitted on 10 uplink subframes at the same time in an interval of every 10 ms.

The frame structure Type 2 is applicable to Time Division Duplexing (TDD). FIG. 2 is a schematic diagram of a frame structure of a TDD mode. As shown in FIG. 2, one radio frame has a length of 10 ms, and is composed of two half frames having a length of 5 ms. One half frame is composed of 5 subframes having a length of 1 ms. Supported uplink-downlink configuration is as shown in Table 1. In the table, "D" denotes that the subframe is a downlink subframe, "U" denotes that the subframe is an uplink subframe, and "S" denotes that the subframe is a special subframe. Each special subframe is composed of a Downlink Pilot Time Slot (DwPTS), a Guard Period (GP) and an Uplink Pilot Time Slot (UpPTS), and has a total length of 1 ms. Each subframe i is composed of two time slots 2i and 2i+1 each having a length of 0.5 ms. The frame structure Type 2 supports 5 ms downlink-to-uplink switch-point periodicity and 10 ms downlink-to-uplink switch-point periodicity. In the 5 ms downlink-to-uplink switch-point periodicity, the special subframe exists in both half frames. In the 10 ms downlink-to-uplink switch-point periodicity, the special subframe exists in the first half frame only. Subframes 0 and 5 and the DwPTS are always reserved for downlink transmission. The UpPTS and the subframe immediately following the special subframe are always reserved for uplink transmission. Therefore, for the 5 ms downlink-to-uplink switch-point periodicity, the UpPTSs and subframes 2 and 7 are reserved for uplink transmission; for the 10 ms downlink-to-uplink switch-point periodicity, the UpPTS and the subframe 2 are reserved for uplink transmission.

TABLE 1

| Uplink-downlink configuration | | | | | | | | | | | |
|---|---|---|---|---|---|---|---|---|---|---|---|
| Uplink-downlink configuration | Downlink-to-uplink switch-point periodicity | Subframe number | | | | | | | | | |
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In the LTE, three kinds of downlink physical control channels are defined as follows: a Physical Control Format Indicator Channel (PCFICH), a Physical Hybrid Automatic Retransmission Request Indicator Channel (PHICH), and a Physical Downlink Control Channel (PDCCH).

Information borne by the PCFICH is used to indicate the number of Orthogonal Frequency Division Multiplexing (OFDM) symbols transmitted in the PDCCH in a subframe, and is transmitted on the first OFDM symbol in the subframe, and a frequency position of the information is determined by a downlink bandwidth of a system and a cell Identity (ID).

The PHICH is configured to bear Acknowledgement/Negative Acknowledgement (ACK/NACK) feedback information of uplink transmission data. The number and time-frequency position of the PHICH may be determined by a system message and a cell ID in a Physical Broadcast Channel (PBCH) of a downlink carrier where the PHICH is located.

The PDCCH is configured to bear Downlink Control Information (DCI), including scheduling information of a Physical Uplink Shared Channel (PUSCH), scheduling information of a Physical Downlink Shared Channel (PDSCH) and uplink power control information.

For FDD, when a UE detects, in the subframe n, the PDCCH channel which belongs to the UE and bears the scheduling information of the PUSCH, or when the UE receives, in the subframe n, the PHICH which belongs to the UE and corresponds to the PUSCH, the UE will transmit in the subframe n+4 data of the PUSCH depending on circumstances.

For the uplink-downlink configurations 1 to 6 for TDD, when the UE detects, in the subframe n, the PDCCH channel which belongs to the UE and bears the scheduling information of the PUSCH, or when the UE receives, in the subframe n, the PHICH which belongs to the UE and corresponds to the PUSCH, the UE will transmit in the subframe n+k data of the PUSCH depending on circumstances. For the uplink-downlink configuration 0 for TDD, when the UE detects, in the subframe n, the PDCCH channel which belongs to the UE and bears the scheduling information of the PUSCH and UL Index signalling in the scheduling information has an upper bit of 1, or when the UE receives, in the subframe 0 and the subframe 5, the PHICH which belongs to the UE and corresponds to the PUSCH and the IPHICH is equal to 0, the UE will transmit in the subframe n+k data of the PUSCH depending on circumstances. When the UE detects, in the subframe n, the PDCCH channel which belongs to the UE and bears the scheduling information of the PUSCH and UL Index signalling in the scheduling information has a lower bit of 1, or when the UE receives, in the subframe 0 and the subframe 5, the PHICH which belongs to the UE and corresponds to the PUSCH and the IPHICH is equal to 1, the UE will transmit in the subframe n+7 data of the PUSCH depending on circumstances. The value of k hereinbefore is as shown in Table 2:

TABLE 2

Diagram of the value of k for configurations 0-6 for TDD

| Uplink-downlink configurations for TDD | Downlink subframe number n | | | | | | | | | |
|---|---|---|---|---|---|---|---|---|---|---|
| | 0 | 1 | 2 | 3 | 4 | 5 | 6 | 7 | 8 | 9 |
| 0 | 4 | 6 | | | | 4 | 6 | | | |
| 1 | | 6 | | | 4 | | 6 | | | 4 |
| 2 | | | | 4 | | | | | 4 | |
| 3 | 4 | | | | | | | | 4 | 4 |
| 4 | | | | | | | | | 4 | 4 |
| 5 | | | | | | | | | 4 | |
| 6 | 7 | 7 | | | | 7 | 7 | | | 5 |

In the Release (R) 8/9 of the LTE system, a Common Reference Signal (CRS) is designed to measure the channel quality and demodulate received data symbols. The UE may measure the channel through the CRS, so as to support the UE to reselect a cell and switch to a target cell, and to measure the channel quality in a UE connection state. In LTE R10, in order to further improve the average spectrum efficiency of the cell and the cell-edge spectrum efficiency as well as the throughput of each UE, two reference signals are defined respectively: a Channel State Information Reference Signal (CSI-RS) and a Demodulation Reference Signal (DMRS). Status information of a channel is acquired by the CSI-RS. A Precoding Matrix Index (PMI), a Channel Quality Indicator (CQI) and a Rank Indicator (RI), which the UE needs to feed back to an eNB, may be calculated by measuring the CSI-RS. Data borne on a downlink shared channel is demodulated by the DMRS. By DMRS demodulation, the interference between different receiving sides and between different cells may be reduced by a beam method, the performance degradation caused by codebook granularity may be reduced, and the overhead of the downlink control signalling is reduced to a certain extent.

In LTE R8, R9 and R10, the PDCCH is mainly distributed at first 1, 2 or 3 OFDMs of one subframe. The specific distribution needs to be configured according to different subframe types and the number of CRS ports, as shown in Table 3:

TABLE 3

| Subframe | The number of PDCCH OFDM symbols of $N_{RB}^{DL} > 10$ | The number of PDCCH OFDM symbols of $N_{RB}^{DL} \leq 10$ |
|---|---|---|
| Subframe 1 and subframe 6 in subframe Type 2 | 1, 2 | 2 |
| Subframe supporting a Multicast Broadcast Single Frequency Network (MBSFN) on a carrier of the PDSCH, the CRS is configured for port 1 or 2 | 1, 2 | 2 |
| Subframe supporting the MBSFN on the carrier of the PDSCH, the CRS is configured for port 4 | 2 | 2 |
| Subframe not supporting a carrier transmitted on the PDSCH | 0 | 0 |
| Non-MBSFN subframe configured as a PRS (except the subframe 6 of the subframe structure Type 2) | 1, 2, 3 | 2, 3 |
| All other things | 1, 2, 3 | 2, 3, 4 |

Blind detection is required at each receiving side according to the first three symbols. The initial position of the blind detection is related to the number of elements of the control channel, radio network temporary identity allocated to the receiving side and different control information. The control information may generally be classified into common control information and dedicated control information. The common control information is generally placed in common search space of the PDCCH, and the dedicated control information may be placed in all common space and the dedicated search space. The receiving side determines, after the blink detection, whether there is a common system message, downlink scheduling information or uplink scheduling information in the current subframe. Since the downlink control information has no Hybrid Automatic Retransmission Request (HARQ) feedback, it is necessary to ensure that an error rate of detection is as low as possible.

In order to obtain a greater operating spectrum and system bandwidth, several consecutive component carriers (spectrums) distributed on different frequency bands may be aggregated by carrier aggregation technology to form a bandwidth that may be used by LTE-Advanced, e.g., 100 MHz. That is, the aggregated spectrums are divided into n component carriers (spectrums), and the spectrums in each component carrier (spectrum) are consecutive. The spectrum is divided into a Primary Component Carrier (PCC) and a Secondary Component Carrier (SCC), which are also referred to as a primary cell and a secondary cell.

Over an LTE R10 heterogeneous network, since there is stronger interference between different types of base stations, in consideration of the interference of a Macro eNodeB with a Pico eNodeB and the interference of a Home eNodeB with the Macro eNodeB, a resource muting method is proposed to solve mutual interference between different base stations. The specific resource muting method may be a subframe-based muting method (e.g., an Almost Blank Subframe (ABS) method), and may also be a resource-element-based method (e.g., a CRS muting method).

However, the methods above not only increase resource waste, but also bring about severe restriction to scheduling. In particular, when the ABS configuration of the Macro eNodeB is considered, if there are many deployed Pico eNodeBs, there are more ABSs which need to be configured by the Macro eNodeB, which will have greater impact on the Macro eNodeB, thereby increasing the resource waste and further increasing the scheduling delay. Moreover, it is impossible to solve the interference between CRS resource and data resource, and it is also impossible for the muting CRS method to solve the interference between data resources. Additionally, the methods above have bad backward compatibility, so more standardization efforts may be required while the access delay is increased.

At the LTE R11 stage, it is possible to introduce more UEs to perform transmitting on the MBSFN subframe, which will result in that the capacity of two OFDM symbols of the PDCCH used for bearing is not enough. In order to ensure the backward compatibility to R8/R9/R10 UEs, new resources used for transmitting the control information needs to be developed on the PDSCH resource, and Coordinated Multi-Point Transmission (COMP) technology is introduced at the R11 stage. Such technology may solve the interference between difference types of cells in a way of space division, and save the overhead of resources, thereby avoiding the resource waste caused by muting and reducing the restriction to scheduling. However, the existing manner for the time-domain PDCCH cannot solve the problem in the way of space division, and in consideration of the backward compatibility to the R8 and R9, a manner for such a control channel as the time-domain PDCCH must be reserved. Therefore, how to solve the interference between the control channels by space division technology is needed to be meticulously studied.

SUMMARY

In view of the above, the disclosure provides a method and a system for processing downlink control information, by which a region where the downlink control information is transmitted is added, so as to make full use of space division technology, reduce the interference between control channels, and enlarge the capacity of the downlink control channel.

To this end, the technical solutions of the disclosure are implemented as follows.

A method for processing downlink control information includes that:

downlink control information for the subframe n is transmitted in a subframe n; or the downlink control information for the subframe n is transmitted in a subframe n−1.

The downlink control information for the subframe n may be transmitted in a first time slot and/or a second time slot of the subframe n−1, wherein a time-domain position of a region where the downlink control information for the subframe n may be transmitted in the subframe n−1 is g consecutive Orthogonal Frequency Division Multiplexing (OFDM) symbols in the subframe n−1, where g is configured by signalling or g is a predefined value;

or the downlink control information for the subframe n may be transmitted in the second time slot of the subframe n−1, or the downlink control information for the subframe n may be transmitted in the first time slot of the subframe n.

When the downlink control information for the subframe n is transmitted in the second time slot of the subframe n−1 or when the downlink control information for the subframe n is transmitted in the first time slot of the subframe n, the downlink control information for the subframe n may be transmitted according to at least one of the following transmitting approaches:

Approach 1:

transmitting in the second time slot of the subframe n−1 downlink control information for the subframe n which relates to PDSCH scheduling, and transmitting in the first time slot of the subframe n downlink control information for the subframe n which relates to PUSCH scheduling;

Approach 2:

transmitting in the second time slot of the subframe n−1 downlink control information for the subframe n which relates to PDSCH scheduling, or transmitting in the first time slot of the subframe n downlink control information for the subframe n which relates to PDSCH scheduling; and transmitting in the first time slot of the subframe n downlink control information for the subframe n which relates to PUSCH scheduling;

Approach 3:

transmitting in the second time slot of the subframe n−1 downlink control information for the subframe n which relates to PDSCH scheduling, or transmitting in the first time slot of the subframe n downlink control information for the subframe n which relates to PDSCH scheduling; and transmitting in the second time slot of the subframe n−1 downlink control information for the subframe n which relates to PUSCH scheduling, or transmitting in the first time slot of the subframe n downlink control information for the subframe n which relates to PUSCH scheduling; and Approach 4:

transmitting in the second time slot of the subframe n−1 downlink control information for the subframe n which relates to PDSCH scheduling, or transmitting in the first time slot of the subframe n the downlink control information for the subframe n which relates to PDSCH scheduling; and transmitting in a second time slot of the subframe n downlink control information for the subframe n which relates to PUSCH scheduling.

The method may further include that:

when the Approach 1 is applied, a User Equipment (UE) detects in the first time slot of the subframe n the downlink control information for the subframe n which relates to PDSCH scheduling, and detects in the second time slot of the subframe n−1 the downlink control information for the subframe n which relates to PUSCH scheduling;

when the Approach 2 is applied, the UE detects in the first time slot of the subframe n and the second time slot of the subframe n−1 the downlink control information for the subframe n which relates to PDSCH scheduling, and detects in the first time slot of the subframe n the downlink control information for the subframe n which relates to PUSCH scheduling;

when the Approach 3 is applied, the UE detects in the first time slot of the subframe n and the second time slot of the subframe n−1 the downlink control information for the subframe n which relates to PDSCH scheduling, and detects in the first time slot of the subframe n and the second time slot of the subframe n−1 the downlink control information for the subframe n which relates to PUSCH scheduling; and when the Approach 4 is applied, the UE detects in the second time slot of the subframe n−1 the downlink control information for the subframe n which relates to PDSCH scheduling and downlink control information for the subframe n−1 which relates to PUSCH scheduling, detects in the first time slot of the subframe n the downlink control information for the subframe n which relates to PDSCH scheduling, and detects in the second time slot of the subframe n downlink control information for a subframe n+1 which relates to PDSCH scheduling and the downlink control information for the subframe n which relates to PUSCH scheduling.

It may be configured by signalling whether the downlink control information for the subframe n is transmitted in the subframe n−1; and for a Time Division Duplexing (TDD) system, the subframe n may be a downlink subframe, and the subframe n−1 may be a last downlink subframe preceding the subframe n.

When the downlink control information for the subframe n is only transmitted in the subframe n, the downlink control information for the subframe n may be transmitted in a first time slot of the subframe n, or the downlink control information for the subframe n may be transmitted in the first time slot and a second time slot of the subframe n.

A time-domain position of a region where the downlink control information is transmitted in the second time slot of the subframe n may be m consecutive OFDM symbols starting from a h-th OFDM symbol in the second time slot of the subframe n, wherein h and m may be predefined values or may be configured by signalling, or the time-domain position of the region where the downlink control information is transmitted in the second time slot of the subframe n may be from a first OFDM symbol to a last OFDM symbol in the second time slot of the subframe n; and there may be one or two regions where the downlink control information is transmitted in the first time slot of the subframe n.

When there is one region where the downlink control information is transmitted in the first time slot of the subframe n, the time-domain position of the region may be first A consecutive OFDM symbols in the first time slot of the subframe n, where A may be configured by the signalling, which is transmitted on a Physical Control Format Indicator Channel (PCFICH), or the time-domain position of the region may be last B consecutive OFDM symbols in the first time slot of the subframe n, where B may be configured by the signalling or is a predefined value; and when there are two regions where the downlink control information is transmitted in the first time slot of the subframe n, a time-domain position of the first region may be the first A consecutive OFDM symbols in the first time slot of the subframe n, where A may be configured by the signalling, which is transmitted on the PCFICH, a time-domain position of the second region may be the last B consecutive OFDM symbols in the first time slot of the subframe n, where B may be configured by the signalling, or B may be a predefined value or B may be determined by A, and a frequency-domain position of the first region may be a full bandwidth or a partly consecutive bandwidth, and a frequency-domain position of the second region may be configured by the signalling.

The method may further include that:

the UE detects in the first time slot of the subframe n the downlink control information for the subframe n, or the UE detects in the first time slot and the second time slot of the subframe n the downlink control information for the subframe n.

Common search space of the UE may be located in the first region in the first time slot of the subframe n, or the common search space of the UE may be located in the second region in the first time slot of the subframe n, or the common search space of the UE may be located in a second time slot of the subframe n−1; and dedicated search space of the UE may be located in the first region in the first time slot of the subframe n, or the dedicated search space of the UE may be located in the second region in the first time slot of the subframe n, or the dedicated search space of the UE may be located in the second time slot of the subframe n and in the second region in the first time slot of the subframe n, or the dedicated search space of the UE may be located in the second time slot of the subframe n−1 and in the second region in the first time slot of the subframe n.

A system for processing downlink control information includes: a base station configured to:

transmit in a subframe n downlink control information for the subframe n; or transmit in a subframe n−1 the downlink control information for the subframe n.

The base station may be configured to:

transmit in a first time slot and/or a second time slot of the subframe n−1, the downlink control information for the subframe n, wherein a time-domain position of a region where the downlink control information for the subframe n is transmitted in the subframe n−1 may be g consecutive Orthogonal Frequency Division Multiplexing (OFDM) symbols in the subframe n−1, where g may be configured by signalling or g may be a predefined value;

or transmit in the second time slot of the subframe n−1 the downlink control information for the subframe n, or transmit in a first time slot of the subframe n the downlink control information for the subframe n.

The base station may be configured to, when the downlink control information for the subframe n is transmitted in the second time slot of the subframe n−1 or when the downlink control information for the subframe n is transmitted in the first time slot of the subframe n, transmit the downlink control information for the subframe n according to at least one of the following transmitting approaches:

Approach 1: transmitting in the second time slot of the subframe n−1 downlink control information for the subframe n which relates to PDSCH scheduling, and transmitting in the first time slot of the subframe n downlink control information for the subframe n which relates to PUSCH scheduling;

Approach 2: transmitting in the second time slot of the subframe n−1 downlink control information for the subframe n which relates to PDSCH scheduling, or transmitting in the first time slot of the subframe n downlink control information for the subframe n which relates to PDSCH scheduling; and transmitting in the first time slot of the subframe n downlink control information for the subframe n which relates to PUSCH scheduling;

Approach 3: transmitting in the second time slot of the subframe n−1 downlink control information for the subframe n which relates to PDSCH scheduling, or transmitting in the first time slot of the subframe n downlink control information for the subframe n which relates to PDSCH scheduling; and transmitting in the second time slot of the subframe n−1 downlink control information for the subframe n which relates to PUSCH scheduling, or transmitting in the first time slot of the subframe n downlink control information for the subframe n which relates to PUSCH scheduling; and Approach 4: transmitting in the second time slot of the subframe n−1 downlink control information for the subframe n which relates to PDSCH scheduling, or transmitting in the first time slot of the subframe n downlink control information for the subframe n which relates to PDSCH scheduling; and transmitting in a second time slot of the subframe n downlink control information for the subframe n which relates to PUSCH scheduling.

The system may further include: a UE configured to:

when the Approach 1 is applied, detect in the first time slot of the subframe n the downlink control information for the subframe n which relates to PDSCH scheduling, and detect in the second time slot of the subframe n−1 the downlink control information for the subframe n which relates to PUSCH scheduling;

when the Approach 2 is applied, detect in the first time slot of the subframe n and the second time slot of the subframe n−1 the downlink control information for the subframe n which relates to PDSCH scheduling, and detect in the first time slot of the subframe n the downlink control information for the subframe n which relates to PUSCH scheduling;

when the Approach 3 is applied, detect in the first time slot of the subframe n and the second time slot of the subframe n−1 the downlink control information for the subframe n which relates to PDSCH scheduling, and detect in the first time slot of the subframe n and the second time slot of the subframe n−1 the downlink control information for the subframe n which relates to PUSCH scheduling; and when the Approach 4 is applied, detect in the second time slot of the subframe n−1 the downlink control information for the subframe n which relates to PDSCH scheduling and the downlink control information for the subframe n−1 which relates to PUSCH scheduling, detect in the first time slot of the subframe n the downlink control information for the subframe n which relates to PDSCH scheduling, and detect in the second time slot of the subframe n downlink control information for a subframe n+1 which relates to PDSCH scheduling and the downlink control information for the subframe n which relates to PUSCH scheduling.

It may be configured by signalling whether the downlink control information for the subframe n is transmitted in the subframe n−1; and for a Time Division Duplexing (TDD) system, the subframe n may be a downlink subframe, and the subframe n−1 may be a last downlink subframe preceding the subframe n.

The base station may be configured to: when the downlink control information for the subframe n is only transmitted in the subframe n, transmit in the first time slot of the subframe n the downlink control information for the subframe n, or transmit in a first time slot and a second time slot of the subframe n the downlink control information for the subframe n.

A time-domain position of a region where the downlink control information is transmitted in the second time slot of the subframe n may be m consecutive OFDM symbols starting from a h-th OFDM symbol in the second time slot of the subframe n, where h and m may be predefined values or may be configured by signalling, or the time-domain position of the region where the downlink control information is transmitted in the second time slot of the subframe n may be from a first OFDM symbol to a last OFDM symbol in the second time slot of the subframe n; and there may be one or two regions where the downlink control information is transmitted in the first time slot of the subframe n.

When there is one region where the downlink control information is transmitted in the first time slot of the subframe n, the time-domain position of the region may be first A consecutive OFDM symbols in the first time slot of the subframe n, where A may be configured by the signalling, which is transmitted on a Physical Control Format Indicator Channel (PCFICH), or the time-domain position of the region may be last B consecutive OFDM symbols in the first time slot of the subframe n, where B may be configured by the signalling or is a predefined value; and when there are two regions where the downlink control information is transmitted in the first time slot of the subframe n, a time-domain position of the first region may be the first A consecutive OFDM symbols in the first time slot of the subframe n, where A may be configured by the signalling, which is transmitted on the PCFICH, a time-domain position of the second region may be the last B consecutive OFDM symbols in the first time slot of the subframe n, where B may be configured by the signalling, or B may be a predefined value or B may be determined by A, and a frequency-domain position of the first region may be a full bandwidth or a partly consecutive bandwidth, and a frequency-domain position of the second region may be configured by the signalling.

The UE may be further configured to:

detect in the first time slot of the subframe n the downlink control information for the subframe n, or detect in the first time slot and the second time slot of the subframe n the downlink control information for the subframe n.

Common search space of the UE may be located in the first region in the first time slot of the subframe n, or the common search space of the UE may be located in the second region in the first time slot of the subframe n, or the common search space of the UE may be located in a second time slot of the subframe n−1; and dedicated search space of the UE may be located in the first region in the first time slot of the subframe n, or the dedicated search space of the UE may be located in the second region in the first time slot of the subframe n, or the dedicated search space of the UE may be located in the second time slot of the subframe n and in the second region in the first time slot of the subframe n, or the dedicated search space of the UE may be located in the second time slot of the subframe n−1 and in the second region in the first time slot of the subframe n.

By means of the technology for processing control channel information provided by the disclosure, a region where the downlink control information is transmitted is added, and space division technology can be fully utilized, so that a load of a PDCCH is reduced, the interference between control channels is reduced, and the capacity of the control channel is enlarged.

DETAILED DESCRIPTION

Figure 1:
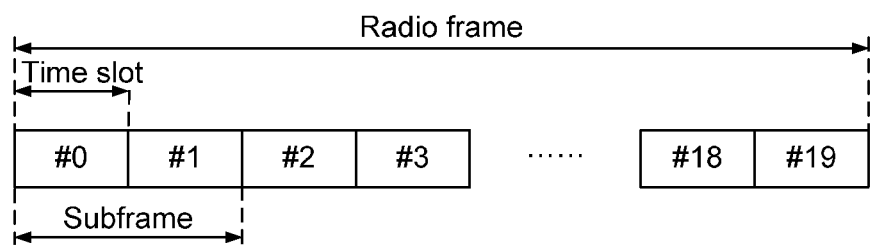
FIG. 1 is a schematic diagram of a frame structure of Type 1 of an LTE system.
Figure 2:
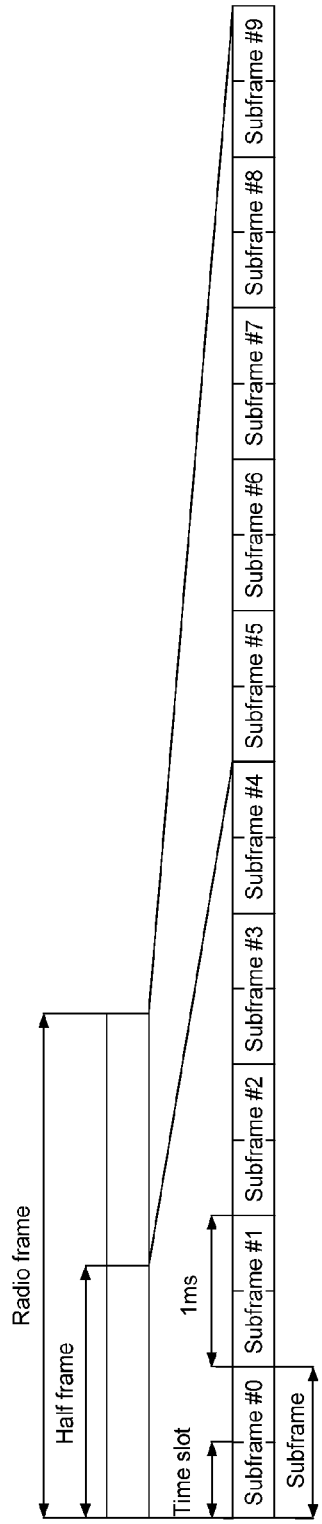
FIG. 2 is a schematic diagram of a frame structure of Type 2 of an LTE system.

In practical applications, a base station may transmit in a subframe n downlink control information for the subframe n, or transmit in a subframe n−1 the downlink control information for the subframe n.

It should be noted that the downlink control information for the subframe n is the downlink control information originally scheduled to be transmitted in the subframe n in an LTE system, that is, the downlink control information for the subframe n is scheduling information which relates to a PDSCH on a downlink subframe n and/or scheduling information which relates to a PUSCH on an uplink subframe n+k, where k is defined in Table 2.

Scenario I

Further, the downlink control information for the subframe n is transmitted in a first time slot and/or a second time slot of the subframe n−1.

Still further, a time-domain position of a region where the downlink control information for the subframe n is transmitted in the subframe n−1 is g consecutive OFDM symbols in the subframe n−1, where g is configured by signalling or g is a predefined value.

Scenario II

Further, the downlink control information for the subframe n is transmitted in the second time slot of the subframe n−1, or the downlink control information for the subframe n is transmitted in the first time slot of the subframe n.

Approach 1

Still further, the downlink control information for the subframe n which relates to PDSCH scheduling is transmitted in the second time slot of the subframe n−1, and the downlink control information for the subframe n which relates to PUSCH scheduling is transmitted in the first time slot of the subframe n.

Still further, a UE detects in the first time slot of the subframe n the downlink control information for the subframe n which relates to PDSCH scheduling, and detects in the second time slot of the subframe n−1 the downlink control information for the subframe n which relates to PUSCH scheduling.

Approach 2

Still further, the downlink control information for the subframe n which relates to PDSCH scheduling is transmitted in the second time slot of the subframe n−1, or the downlink control information for the subframe n which relates to PDSCH scheduling is transmitted in the first time slot of the subframe n; and the downlink control information for the subframe n which relates to PUSCH scheduling is transmitted in the first time slot of the subframe n.

Still further, the UE detects in the first time slot of the subframe n and the second time slot of the subframe n−1 the downlink control information for the subframe n which relates to PDSCH scheduling, and detects in the first time slot of the subframe n the downlink control information for the subframe n which relates to PUSCH scheduling.

Approach 3

Still further, the downlink control information for the subframe n which relates to PDSCH scheduling is transmitted in the second time slot of the subframe n−1, or the downlink control information for the subframe n which relates to PDSCH scheduling is transmitted in the first time slot of the subframe n; and the downlink control information for the subframe n which relates to PUSCH scheduling is transmitted in the second time slot of the subframe n−1, or the downlink control information for the subframe n which relates to PUSCH scheduling is transmitted in the first time slot of the subframe n.

Still further, the UE detects in the first time slot of the subframe n and the second time slot of the subframe n−1 the downlink control information for the subframe n which relates to PDSCH scheduling, and detects in the first time slot of the subframe n and the second time slot of the subframe n−1 the downlink control information for the subframe n which relates to PUSCH scheduling.

Approach 4

Still further, the downlink control information for the subframe n which relates to PDSCH scheduling is transmitted in the second time slot of the subframe n−1, or the downlink control information for the subframe n which relates to PDSCH scheduling is transmitted in the first time slot of the subframe n; and the downlink control information for the subframe n which relates to PUSCH scheduling is transmitted in a second time slot of the subframe n.

Still further, the UE detects in the second time slot of the subframe n−1 the downlink control information for the subframe n which relates to PDSCH scheduling and the downlink control information for the subframe n−1 which relates to PUSCH scheduling, the UE detects in the first time slot of the subframe n the downlink control information for the subframe n which relates to PDSCH scheduling, and the UE detects, in the second time slot of the subframe n, the downlink control information for a subframe n+1 which relates to PDSCH scheduling and the downlink control information for the subframe n which relates to PUSCH scheduling.

Further, it is configured by the signalling whether the downlink control information for the subframe n is transmitted in the subframe n−1.

Further, for a TDD system, the subframe n is a downlink subframe, and the subframe n−1 is a last downlink subframe preceding the subframe n.

Scenario III

Further, when the downlink control information for the subframe n is only transmitted in the subframe n, the downlink control information for the subframe n is transmitted in the first time slot of the subframe n, or the downlink control information for the subframe n is transmitted in the first time slot and the second time slot of the subframe n.

Still further, the UE detects in the first time slot of the subframe n the downlink control information for the subframe n, or the UE detects in the first time slot and the second time slot of the subframe n the downlink control information for the subframe n.

For the three scenes, the specific region where the downlink control information is transmitted is defined as follows:

a time-domain position of a region where the downlink control information is transmitted in the second time slot of the subframe n is m consecutive OFDM symbols starting from a h-th OFDM symbol in the second time slot, where h and m are predefined values, or h and m are configured by the signalling;

or the time-domain position of the region where the downlink control information is transmitted in the second time slot of the subframe n is from the first OFDM symbol to the last OFDM symbol in the second time slot.

Further, there is one or two regions where the downlink control information is transmitted in the first time slot of the subframe n.

Still further, when the number of the regions is 1, the time-domain position of the region is the first A consecutive OFDM symbols in the first time slot of the subframe n, where A is configured by the signalling and the signalling is transmitted on a PCFICH; or the time-domain position of the region is the last B consecutive OFDM symbols in the first time slot of the subframe n, where B is configured by the signalling or is a predefined value; and when the number of the regions is 2, the time-domain position of the first region is the first A consecutive OFDM symbols in the first time slot of the subframe n, where A is configured by the signalling and the signalling is transmitted on the PCFICH; and the time-domain position of the second region is the last B consecutive OFDM symbols in the first time slot of the subframe n, where B is configured by the signalling or B is a predefined value or B is determined by A.

Still further, a frequency-domain position of the first region is a full bandwidth or a partly consecutive bandwidth; and the frequency-domain position of the second region is configured by the signalling.

Still further, common search space of the UE is located in the first region in the first time slot of the subframe n, or the common search space of the UE is located in the second region in the first time slot of the subframe n, or the common search space of the UE is located in the second time slot of the subframe n−1; and dedicated search space of the UE is located in the first region in the first time slot of the subframe n, or the dedicated search space of the UE is located in the second region in the first time slot of the subframe n, or the dedicated search space of the UE is located in the second time slot of the subframe n and in the second region in the first time slot of the subframe n, or the dedicated search space of the UE is located in the second time slot of the subframe n−1 and in the second region in the first time slot of the subframe n.

Embodiment 1

The downlink control information for the subframe n is transmitted in the subframe n, or the downlink control information for the subframe n is transmitted in the subframe n−1.

The downlink control information for the subframe n is transmitted in the first time slot and the second time slot of the subframe n−1.

The time-domain position of the region where the downlink control information for the subframe n is transmitted in the subframe n−1 is last g consecutive OFDM symbols in the subframe n−1.

g is configured by signalling. If the number of OFDM symbols of the PDCCH transmitted in the subframe n−1 is T and the number of OFDM symbols included in a subframe is W, then g=W−T.

Alternatively, g is a predefined value. For example, if the number of OFDM symbols included in one subframe is W, then g is W or W−3 or W−4 or W−2.

For a TDD system, the subframe n is a downlink subframe, and the subframe n−1 is a last downlink subframe preceding the subframe n.

Figure 3:
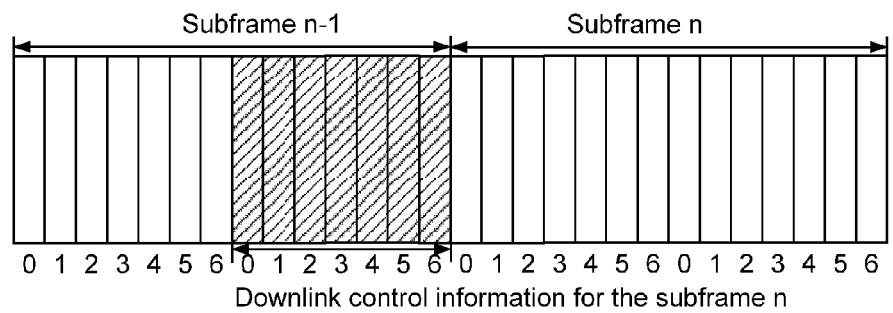
FIG. 3 is a schematic diagram I of transmitting downlink control information according to an embodiment of the disclosure.

The specific position is as shown in FIG. 3.

Specific Application:

The base station transmits Uplink Grant (UL Grant) information in a PDCCH region (as defined in LTE R8, the first m OFDM symbols in the subframe) in the first time slot of the subframe n, and transmits Downlink Grant (DL Grant) information in a PDSCH region in the subframe n−1 (the last g consecutive OFDM symbols in the subframe n−1). The UL Grant information includes scheduling information related to the PUSCH, and the DL Grant includes scheduling information related to the PDSCH.

The UE detects in the PDSCH region in the subframe n−1 the DL Grant information, and detects in the PDCCH region in the first time slot of the subframe n the UL Grant information.

For FDD, the UE receives in the subframe n the PDSCH according to the DL Grant information, and the UE transmits in the uplink subframe n+4 the PUSCH according to the UL Grant information.

For TDD, the UE receives in the subframe n the PDSCH according to the DL Grant information, and the UE transmits in the subframe n+k the PUSCH according to the UL Grant information, where k is defined in Table 2.

Embodiment 2

The downlink control information for the subframe n is transmitted in the second time slot of the subframe n−1, and may also be transmitted in the first time slot of the subframe n.

It is configured by the signalling whether the downlink control information for the subframe n is transmitted in the subframe n−1.

For a TDD system, the subframe n is a downlink subframe, and the subframe n−1 is a last downlink subframe preceding the subframe n.

Figure 4A:
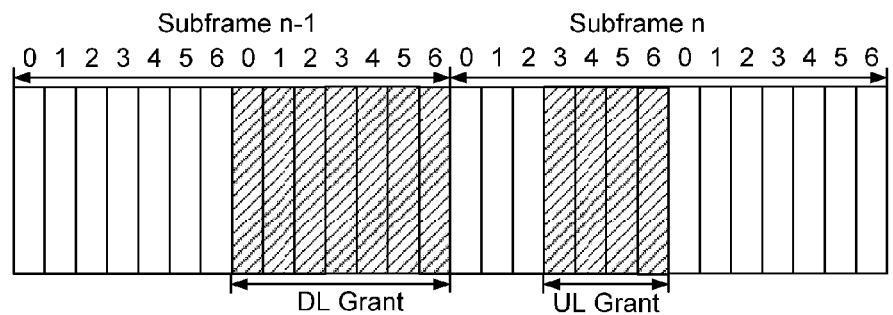
FIGS. 4a-4c are a schematic diagram II of transmitting downlink control information according to an embodiment of the disclosure.
Figure 4B:
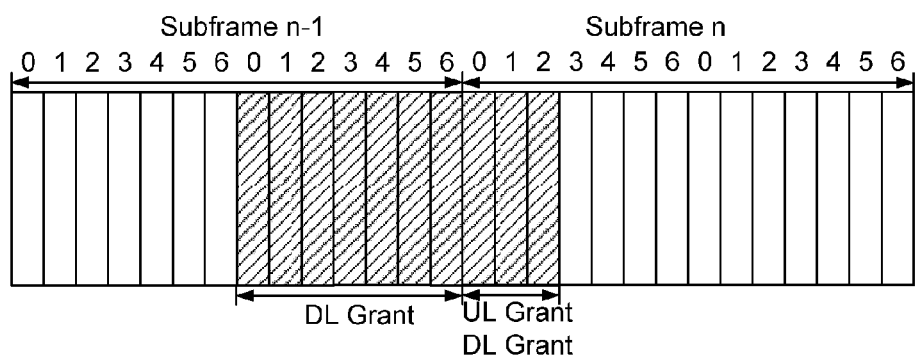
Figure 4C:
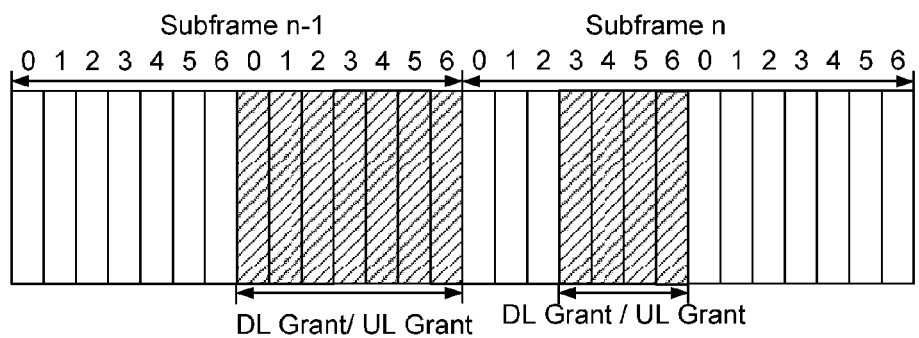

The specific position is as shown in FIG. 4.

Approach 1

The downlink control information (i.e., DL Grant information) for the subframe n which relates to PDSCH scheduling is transmitted in the second time slot of the subframe n−1, and the downlink control information (i.e., UL Grant information) for the subframe n which relates to PUSCH scheduling is transmitted in the first time slot of the subframe n.

The UE detects in the first time slot of the subframe n the downlink control information for the subframe n which relates to PUSCH scheduling, and detects in the second time slot of the subframe n−1 the downlink control information for the subframe n which relates to PDSCH scheduling.

Specific Application 1

The base station transmits in the PDSCH region in the first time slot of the subframe n (as defined in LTE R8, a PDCCH is transmitted in the first m OFDM symbols in the subframe n, and the remaining symbols in the first time slot of the subframe n represent the PDSCH region) UL Grant information, and transmits in the second time slot of the subframe n−1 DL Grant information.

The UE detects in the second time slot of the subframe n−1 the DL Grant information, and detects in the PDSCH region in the first time slot of the subframe n the UL Grant information.

For FDD, the UE receives in the subframe n the PDSCH according to the DL Grant information, and the UE transmits in the uplink subframe n+4 the PUSCH according to the UL Grant information.

For TDD, the UE receives in the subframe n the PDSCH according to the DL Grant information, and the UE transmits in the subframe n+k the PUSCH according to the UL Grant information, where k is defined in Table 2.

Approach 2

The downlink control information for the subframe n which relates to PDSCH scheduling is transmitted in the second time slot of the subframe n−1, or the downlink control information for the subframe n which relates to PDSCH scheduling is transmitted in the first time slot of the subframe n; and the downlink control information for the subframe n which relates to PUSCH scheduling is transmitted in the first time slot of the subframe n.

The UE detects in the second time slot of the subframe n−1 the downlink control information for the subframe n which relates to PDSCH scheduling, and detects in the first time slot of the subframe n the downlink control information for the subframe n which relates to PUSCH scheduling and the downlink control information for the subframe n which relates to PDSCH scheduling.

Specific Application 1

The base station transmits in the PDSCH region (it is defined in LTE R8 that the PDCCH is transmitted in the first m OFDM symbols in the subframe n, and the remaining symbols of the first time slot of the subframe n represent the PDSCH region) in the first time slot of the subframe n UL Grant information, and transmits in the first time slot of the subframe n the DL Grant information.

The UE detects in the PDSCH region in the first time slot of the subframe n the DL Grant information and the UL Grant information.

For FDD, the UE receives in the subframe n the PDSCH according to the DL Grant information, and the UE transmits in the uplink subframe n+4 the PUSCH according to the UL Grant information.

For TDD, the UE receives in the subframe n the PDSCH according to the DL Grant information, and the UE transmits in the subframe n+k the PUSCH according to the UL Grant information, where k is defined in Table 2.

Approach 3

The downlink control information for the subframe n which relates to PDSCH scheduling is transmitted in the second time slot of the subframe n−1, or the downlink control information for the subframe n which relates to PDSCH scheduling is transmitted in the first time slot of the subframe n; and the downlink control information for the subframe n which relates to PUSCH scheduling is transmitted in the second time slot of the subframe n−1, or the downlink control information for the subframe n which relates to PUSCH scheduling is transmitted in the first time slot of the subframe n.

The UE detects in the first time slot of the subframe n the downlink control information for the subframe n which relates to PDSCH scheduling and the downlink control information for the subframe n which relates to PUSCH scheduling, and detects in the second time slot of the subframe n−1 the downlink control information for the subframe n which relates to PUSCH scheduling and the downlink control information for the subframe n which relates to PDSCH scheduling.

Specific Application 1

The base station transmits in the PDSCH region (the last g consecutive OFDM symbols in the first time slot of the subframe n represent the PDCCH region) in the first time slot of the subframe n UL Grant information, and transmits in the second time slot of the subframe n−1 the DL Grant information.

The UE detects in the PDSCH region in the first time slot of the subframe n the UL Grant information, and detects in the second time slot of the subframe n−1 the DL Grant information.

For FDD, the UE receives in the subframe n the PDSCH according to the DL Grant information, and the UE transmits in the uplink subframe n+4 the PUSCH according to the UL Grant information.

For TDD, the UE receives in the subframe n the PDSCH according to the DL Grant information, and the UE transmits in the subframe n+k the PUSCH according to the UL Grant information, where k is defined in Table 2.

Specific Application 2

The base station transmits in the second time slot of the subframe n−1 the DL Grant information and the UL Grant information.

The UE detects in the second time slot of the subframe n−1 the DL Grant information and the UL Grant information.

For FDD, the UE receives in the subframe n the PDSCH according to the DL Grant information, and the UE transmits in the uplink subframe n+4 the PUSCH according to the UL Grant information.

For TDD, the UE receives in the subframe n the PDSCH according to the DL Grant information, and the UE transmits in the subframe n+k the PUSCH according to the UL Grant information, where k is defined in Table 2.

Approach 4

The downlink control information for the subframe n which relates to PDSCH scheduling is transmitted in the second time slot of the subframe n−1, or the downlink control information for the subframe n which relates to PDSCH scheduling is transmitted in the first time slot of the subframe n; and the downlink control information for the subframe n which relates to PUSCH scheduling is transmitted in the second time slot of the subframe n.

The UE detects in the second time slot of the subframe n−1 the downlink control information for the subframe n which relates to PDSCH scheduling and the downlink control information for the subframe n−1 which relates to PUSCH scheduling, the UE detects in the first time slot of the subframe n the downlink control information for the subframe n which relates to PDSCH scheduling, and the UE detects in the second time slot of the subframe n the downlink control information for a subframe n+1 which relates to PDSCH scheduling and the downlink control information for the subframe n which relates to PUSCH scheduling.

Specific Application 1

The base station transmits in the PDSCH region (it is defined in LTE R8 that the PDCCH is transmitted in the first m OFDM symbols in the subframe n, and the remaining symbols in the first time slot of the subframe n represent the PDSCH region) in the first time slot of the subframe n DL Grant information, and transmits in the second time slot of the subframe n the UL Grant information.

The UE detects in the PDSCH region in the first time slot of the subframe n the DL Grant information, and detects in the second time slot of the subframe n the UL Grant information.

For FDD, the UE receives in the subframe n the PDSCH according to the DL Grant information, and the UE transmits in the uplink subframe n+4 the PUSCH according to the UL Grant information.

For TDD, the UE receives in the subframe n the PDSCH according to the DL Grant information, and the UE transmits in the subframe n+k the PUSCH according to the UL Grant information, where k is defined in Table 2.

Embodiment 3

When the downlink control information for the subframe n is only transmitted in the subframe n, the downlink control information for the subframe n is transmitted in the first time slot of the subframe n, and the UE detects in the first time slot of the subframe n the downlink control information for the subframe n.

Specific Application 1

The base station transmits in the PDSCH region (it is defined in LTE R8 that the PDCCH is transmitted in the first m OFDM symbols in the subframe n, and the remaining symbols of the first time slot of the subframe n represent the PDSCH region) in the first time slot of the subframe n UL Grant information and DL Grant information.

The UE detects in the PDSCH region in the first time slot of the subframe n the DL Grant information and the UL Grant information.

For FDD, the UE receives in the subframe n the PDSCH according to the DL Grant information, and the UE transmits in the uplink subframe n+4 the PUSCH according to the UL Grant information.

For TDD, the UE receives in the subframe n the PDSCH according to the DL Grant information, and the UE transmits in the subframe n+k the PUSCH according to the UL Grant information, where k is defined in Table 2.

Specific Application 2

The base station transmits in the PDSCH region in the first time slot of the subframe n (the PDSCH region is from the g-th OFDM symbol to the last OFDM symbol in the first time slot of the subframe n, and g is configured by high layer signalling) UL Grant information and DL Grant information.

The UE detects in the PDSCH region in the first time slot of the subframe n the DL Grant information and the UL Grant information.

For FDD, the UE receives in the subframe n the PDSCH according to the DL Grant information, and the UE transmits in the uplink subframe n+4 the PUSCH according to the UL Grant information.

For TDD, the UE receives in the subframe n the PDSCH according to the DL Grant information, and the UE transmits in the subframe n+k the PUSCH according to the UL Grant information, where k is defined in Table 2.

Embodiment 4

When the downlink control information for the subframe n is only transmitted in the subframe n, the downlink control information for the subframe n is transmitted in the first time slot and the second time slot of the subframe n, and the UE detects in the first time slot and the second time slot of the subframe n the downlink control information for the subframe n.

Figure 5:
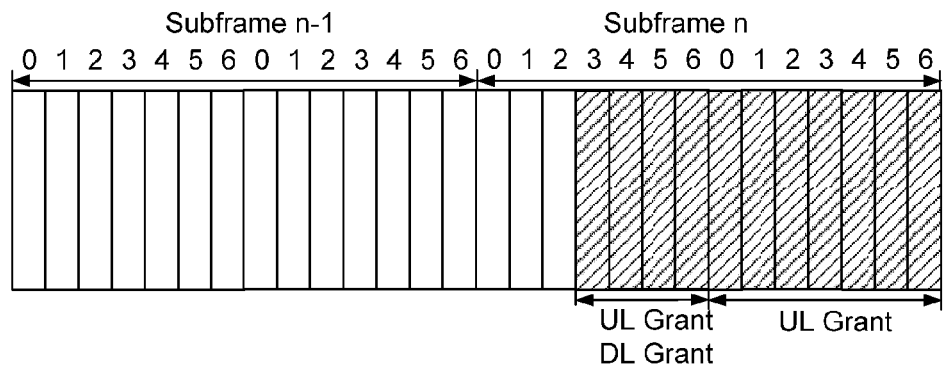
FIG. 5 is a schematic diagram III of transmitting downlink control information according to an embodiment of the disclosure.

The specific position is as shown in FIG. 5.

Approach 1

The DL Grant information is only transmitted in the first time slot of the subframe n, and the UL Grant information may be transmitted in the first time slot of the subframe n or the second time slot of the subframe n.

Specific Application 1

The base station transmits in the PDSCH region (it is defined in LTE R8 that the PDCCH is transmitted in the first m OFDM symbols in the subframe n, and the remaining symbols in the first time slot of the subframe n represent the PDSCH region) in the first time slot of the subframe n the DL Grant information, and transmits in the second time slot of the subframe n the UL Grant information.

The UE detects in the first time slot of the subframe n the DL Grant information in the PDSCH region, and detects in the second time slot of the subframe n the UL Grant information.

For FDD, the UE receives in the subframe n the PDSCH according to the DL Grant information, and the UE transmits in the uplink subframe n+4 the PUSCH according to the UL Grant information.

For TDD, the UE receives in the subframe n the PDSCH according to the DL Grant information, and the UE transmits in the subframe n+k the PUSCH according to the UL Grant information, where k is defined in Table 2.

Specific Application 2

The base station transmits in the PDSCH region (the PDSCH region is from the g-th OFDM symbol to the last OFDM symbol in the first time slot of the subframe n, and g is configured by high layer signalling) in the first time slot of the subframe n the UL Grant information and the DL Grant information.

The UE detects in the PDSCH region in the first time slot of the subframe n the DL Grant information and the UL Grant information.

For FDD, the UE receives in the subframe n the PDSCH according to the DL Grant information, and the UE transmits in the uplink subframe n+4 the PUSCH according to the UL Grant information.

For TDD, the UE receives in the subframe n the PDSCH according to the DL Grant information, and the UE transmits in the subframe n+k the PUSCH according to the UL Grant information, where k is defined in Table 2.

Approach 2

The DL Grant information is only transmitted in the first time slot of the subframe n, and the UL Grant information is only transmitted in the second time slot of the subframe n.

Specific Application 1

The base station transmits in the PDSCH region (the PDSCH region is from the g-th OFDM symbol to the last OFDM symbol in the first time slot of the subframe n, and g is configured by high layer signalling) in the first time slot of the subframe n the DL Grant information, and transmits in the second time slot of the subframe n the UL Grant information.

The UE detects in the PDSCH region in the first time of the subframe n the DL Grant information, and detects in the second time slot of the subframe n the UL Grant information.

For FDD, the UE receives in the subframe n the PDSCH according to the DL Grant information, and the UE transmits in the uplink subframe n+4 the PUSCH according to the UL Grant information.

For TDD, the UE receives in the subframe n the PDSCH according to the DL Grant information, and the UE transmits in the subframe n+k the PUSCH according to the UL Grant information, where k is defined in Table 2.

Embodiment 5

A time-domain position of a region where the downlink control information is transmitted in the second time slot is m consecutive OFDM symbols starting from a h-th OFDM symbol in the second time slot, where h and m are predefined values, or h and m are configured by signalling; or the time-domain position of the region where the downlink control information is transmitted in the second time slot is from the first OFDM symbol to the last OFDM symbol in the second time slot.

Figure 6:
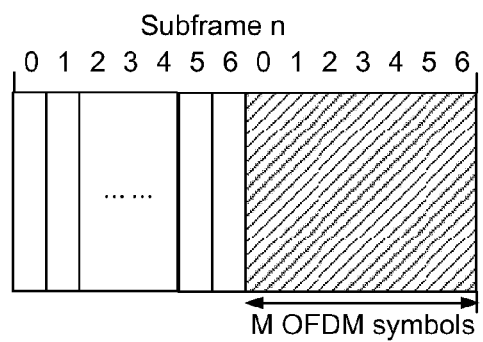
FIG. 6 is a schematic diagram IV of transmitting downlink control information according to an embodiment of the disclosure.

The specific position is as shown in FIG. 6.

The frequency-domain region in the second time slot is configured by signalling, and may be configured in a way of an intensive virtual resource block and a discrete virtual resource block in the type0/type1/type2 in LTE R8.

When the downlink control information is transmitted in the second time slot, the downlink control information may be demodulated by a CRS/DMRS and be transmitted in a multi-antenna transmission manner such as diversity/open-loop multiplexing/closed-loop multiplexing.

Embodiment 6

When the number of the regions where the downlink control information is transmitted in the first time slot is 1, the time-domain position of the region is the first A consecutive OFDM symbols in the first time slot of the subframe, where A is configured by signalling and the signalling is transmitted on a PCFICH, i.e., the region is the same as the region of the PDCCH in the LTE R8/9/10; or the time-domain position of the region is the last B consecutive OFDM symbols in the first time slot of the subframe, where B is configured by signalling or is a predefined value.

Specific Application

In a partial subframe (subframe X), the time-domain position of the region where the downlink control information is transmitted in the first time slot is the first A consecutive OFDM symbols in the first time slot of the subframe, where A is configured by signalling and the signalling is transmitted on the PCFICH. That is, the region where the downlink control information is transmitted in the first time slot is the same as the region of the PDCCH in the LTE R8/9/10.

In a partial subframe (subframe Y), the time-domain position of the region where the downlink control information is transmitted in the first time slot is the last B consecutive OFDM symbols in the first time slot of the subframe, where B is configured by signalling. For example, if the number of OFDM symbols included in the first time slot of the subframe is R and the number of OFDM symbols for transmitting a PDCCH which is indicated on the PCFICH is A, then B=R−A.

The subframe X is a non-MBSFN subframe and the subframe Y is an MBSFN subframe, or the subframe X and the subframe Y are configured by signalling;

Alternatively, B is a predefined value. For example, if the number of OFDM symbols included in the first time slot of the subframe is R, then B is R or R−3 or R−4 or R−2. The subframe is configured by signalling.

Figure 7:
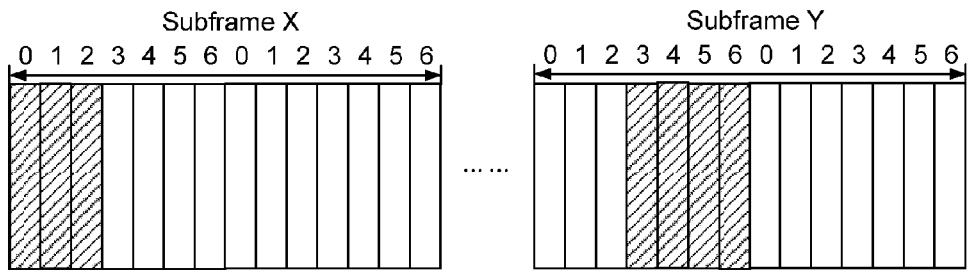
FIG. 7 is a schematic diagram V of transmitting downlink control information according to an embodiment of the disclosure.

The specific position is as shown in FIG. 7.

The time-domain position of the region is the last B consecutive OFDM symbols in the first time slot of the subframe, and the frequency-domain region thereof is configured by signalling, and may be configured in a way of an intensive virtual resource block and a discrete virtual resource block in the type0/type1/type2 in the LTE R8. At this time, the downlink control information may be demodulated by a CRS/DMRS and be transmitted in a multi-antenna transmission manner such as diversity/open-loop multiplexing/closed-loop multiplexing.

The time-domain position of the region is the first A consecutive OFDM symbols in the first time slot of the subframe, and the frequency-domain region thereof is a full bandwidth. At this time, the downlink control information is demodulated by a CRS, and is transmitted in a multi-antenna transmission manner such as diversity/open-loop multiplexing.

Embodiment 7

When the number of the regions where the downlink control information is transmitted in the first time slot is 2, the time-domain position of the first region is the first A consecutive OFDM symbols in the first time slot of the subframe, where A is configured by signalling and the signalling is transmitted on a PCFICH. That is, the region where the downlink control information is transmitted in the first time slot is the same as the region of the PDCCH in the LTE R8/9/10.

The frequency-domain position of the first region is the full bandwidth, or a partly consecutive bandwidth.

The time-domain position of the second region is the last B consecutive OFDM symbols in the first time slot of the subframe, where B is configured by signalling. For example, if the number of OFDM symbols included in the first time slot of the subframe is R and the number of OFDM symbols for transmitting a PDCCH which is indicated on the physical control format indicator channel is A, then B=R−A.

Alternatively, B is a predefined value. For example, if the number of OFDM symbols included in the first time slot of the subframe is R, then B is R or R−3 or R−4 or R−2. The subframe is configured by signalling.

The frequency-domain position of the second region is configured by signalling.

Figure 8:
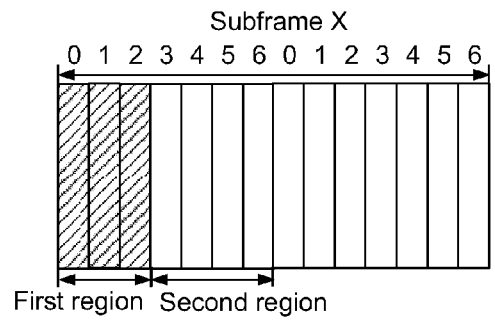
FIG. 8 is a schematic diagram VI of transmitting downlink control information according to an embodiment of the disclosure.

The specific position is as shown in FIG. 8.

The frequency-domain region of the second region in the first time slot is configured by signalling, and may be configured in a way of an intensive virtual resource block and a discrete virtual resource block in the type0/type1/type2 in the LTE R8. At this time, the downlink control information may be demodulated by a CRS/DMRS and be transmitted in multi-antenna transmission manner such as diversity/open-loop multiplexing/closed-loop multiplexing.

The frequency-domain region of the first region in the first time slot is a full bandwidth. At this time, the downlink control information is demodulated by a CRS, and is transmitted in a multi-antenna transmission manner such as diversity/open-loop multiplexing.

The open-loop multiplexing is the same as the open-loop multiplexing defined in the LTE R8, i.e., a large delay Cyclic delay diversity way.

Embodiment 8

The search space of the downlink control information of the UE is assigned as follows:

in the subframe n, the common search space and the dedicated search space of the UE are located in the first region in the first time slot of the subframe n, here, UL Grant information and DL Grant information are transmitted in the second region in the first time slot of the subframe n and/or in the second time slot of the subframe n and/or in the first region in the first time slot of the subframe n;

or in the subframe n, the common search space of the UE is located in the first region in the first time slot of the subframe n, and the dedicated search space of the UE is located in the second region in the first time slot of the subframe n;

or in the subframe n, the common search space of the UE is located in the first region in the first time slot of the subframe n, and the dedicated search space of the UE is located in the second time slot of the subframe n and in the second region in the first time slot of the subframe n;

or in the subframe n, the common search space of the UE is located in the first region in the first time slot of the subframe n, and the dedicated search space of the UE is located in the second time slot of the subframe n and in the first region in the first time slot of the subframe n;

or in the subframe n, the common search space of the UE is located in the first region in the first time slot of the subframe n, and the dedicated search space of the UE is located in the second time slot of the subframe n;

or in the subframe n, the common search space of the UE is located in the second region in the first time slot of the subframe n, and the dedicated search space of the UE is located in the second time slot of the subframe n and in the second region in the first time slot of the subframe n;

or in the subframe n, the common search space of the UE is located in the second region in the first time slot of the subframe n, and the dedicated search space of the UE is located in the second region in the first time slot of the subframe n.

Embodiment 9

When the cross-carrier scheduling configuration on a component carrier (the component carrier may also be referred to as a serving cell) c is enabled, the component carrier c may schedule one or more component carriers. Each component carrier corresponds to one user-specific search space. The search space to which each component carrier corresponds may be located in the same region, and may also be located in a different region.

Specific Application 1

A component carrier c may schedule the component carrier c and a component carrier d, which correspond to the user-specific search space respectively. The search space corresponding to the component carrier c and the search space corresponding to the component carrier d are located in the first region in the first time slot of the subframe n, or in the second region in the first time slot of the subframe n, or in the second time slot and the second region in the first time slot of the subframe n, or in the first time slot of the subframe n and the second time slot of the subframe n−1, respectively.

Specific Application 2

A component carrier c may schedule the component carrier c and a component carrier d, which correspond to the user-specific search space respectively. The search space to which the component carrier c corresponds is located in the first region in the first time slot of the subframe n, and the search space to which the component carrier d corresponds is located in the second region in the first time slot of the subframe n. Alternatively, the search space corresponding to the component carrier c is located in the first region in the first time slot of the subframe n, and the search space corresponding to the component carrier d is located in the second region in the first time slot of the subframe n and in the second time slot. Alternatively, the search space corresponding to the component carrier c is located in the first time slot of the subframe n, and the search space corresponding to the component carrier d is located in the first time slot of the subframe n and the second time slot of the subframe n−1.

Figure 9:
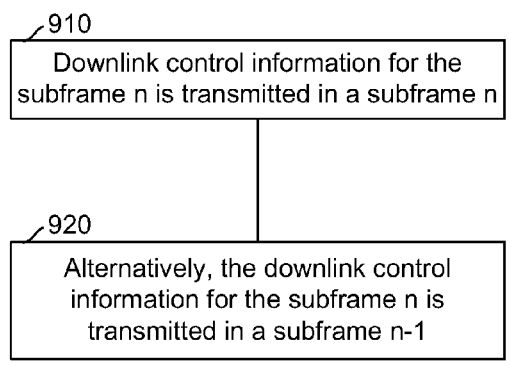
FIG. 9 is a flowchart of processing downlink control information according to an embodiment of the disclosure.

It can be seen from the above embodiments that the operation thought of transmitting downlink control information of the disclosure may be embodied in the flow as shown in FIG. 9. The flow includes:

Step 910: Downlink control information for the subframe n is transmitted in a subframe n.

Step 920: Alternatively, the downlink control information for the subframe n is transmitted in a subframe n−1.

It should be noted that the two steps above may be performed in any chronological order.

To sum up, regardless of the method or the system, by means of the technology for processing control channel information provided by the disclosure, a region where the downlink control information is transmitted is added, and space division technology can be fully utilized, so that a load of a PDCCH is reduced, the interference between control channels is reduced, and the capacity of the control channel is enlarged.

The above are only the preferred embodiments of the disclosure, and are not intended to limit the scope of protection of the claims of the disclosure.

INDUSTRIAL APPLICABILITY

A method and a system for processing downlink control information are disclosed, in which downlink control information for the subframe n may be transmitted in a subframe n or the downlink control information for the subframe n may be transmitted in a subframe n−1. By means of the technology for processing control channel information provided by the disclosure, a region where the downlink control information is transmitted is added, and space division technology can be fully utilized, so that a load of a PDCCH is reduced, the interference between control channels is reduced, and the capacity of the control channel is enlarged.

The invention claimed is:

1. A method for processing downlink control information, comprising:
transmitting in a subframe n downlink control information for the subframe n, or
transmitting in a subframe n−1 the downlink control information for the subframe n,
wherein n is an integer which is greater than or equal to 0, n and n−1 represent subframe numbers, and the subframe n−1 is a previous subframe immediately adjacent to the subframe n, and when n is equal to 0, the subframe n is a first subframe of a current frame, and the subframe n−1 is the last subframe of a previous frame immediately adjacent to the current frame,
and wherein when the downlink control information for the subframe n is transmitted in the subframe n, the downlink control information for the subframe n is transmitted in a first time slot and a second time slot of the subframe n,
wherein
a time-domain position of a region where the downlink control information is transmitted in the second time slot of the subframe n is m consecutive OFDM symbols starting from a h-th OFDM symbol in the second time slot of the subframe n, where h and m are predefined values or h and m are configured by signalling, and m is an integer which is greater than or equal to 1, and h is an integer which is greater than or equal to 1, or
the time-domain position of the region where the downlink control information is transmitted in the second time slot of the subframe n is from a first OFDM symbol to a last OFDM symbol in the second time slot of the subframe n; and
there is one or two regions where the downlink control information is transmitted in the first time slot of the subframe n,
and wherein
when there is one region where the downlink control information is transmitted in the first time slot of the subframe n,
the time-domain position of the region is first A consecutive OFDM symbols in the first time slot of the subframe n, where A is configured by the signalling, which is transmitted on a Physical Control Format Indicator Channel (PCFICH), and A is an integer which is greater than or equal to 1, or
the time-domain position of the region is last B consecutive OFDM symbols in the first time slot of the subframe n, where B is configured by the signalling or is a predefined value, and B is an integer which is greater than or equal to 1; and
when there are two regions where the downlink control information is transmitted in the first time slot of the subframe n,
a time-domain position of the first region is the first A consecutive OFDM symbols in the first time slot of the subframe n, where A is configured by the signalling, which is transmitted on the PCFICH, and A is an integer which is greater than or equal to 1,
a time-domain position of the second region is the last B consecutive OFDM symbols in the first time slot of the subframe n, where B is configured by the signalling, or B is a predefined value or B is determined by A, and B and is an integer which is greater than or equal to 1, and
a frequency-domain position of the first region is a full bandwidth or a partly consecutive bandwidth, and a frequency-domain position of the second region is configured by the signalling.

2. The method according to claim 1, wherein
the downlink control information for the subframe n is transmitted in a first time slot and/or a second time slot of the subframe n−1, wherein
a time-domain position of a region where the downlink control information for the subframe n is transmitted in the subframe n−1 is g consecutive Orthogonal Frequency Division Multiplexing (OFDM) symbols in the subframe n−1, where g is configured by signalling or g is a predefined value, and g is an integer which is greater than or equal to 1;
or
the downlink control information for the subframe n is transmitted in the second time slot of the subframe n, or the downlink control information for the subframe n is transmitted in a first time slot of the subframe n.

3. The method according to claim 2, wherein when downlink control information for the subframe n is transmitted in the second time slot of the subframe n−1 or when the downlink control information for the subframe n is transmitted in the first time slot of the subframe n, the downlink control information for the subframe n is transmitted according to at least one of the following transmitting approaches:

Approach 1:
transmitting in the second time slot of the subframe n−1 downlink control information for the subframe n which relates to Physical Downlink Shared Channel (PDSCH) scheduling, and transmitting in the first time slot of the subframe n downlink control information for the subframe n which relates to Physical Uplink Shared Channel (PUSCH) scheduling;

Approach 2:
transmitting in the second time slot of the subframe n−1 downlink control information for the subframe n which relates to PDSCH scheduling, or transmitting in the first time slot of the subframe n downlink control information for the subframe n which relates to PDSCH scheduling; and transmitting in the first time slot of the subframe n downlink control information for the subframe n which relates to PUSCH scheduling; and Approach 3:

transmitting in the second time slot of the subframe n−1 downlink control information for the subframe n which relates to PDSCH scheduling, or transmitting in the first time slot of the subframe n downlink control information for the subframe n which relates to PDSCH scheduling; and transmitting in the second time slot of the subframe n−1 downlink control information for the subframe n which relates to PUSCH scheduling, or transmitting in the first time slot of the subframe n downlink control information for the subframe n which relates to PUSCH scheduling.

4. The method according to claim 3, further comprising:

when the Approach 1 is applied, detecting, by a User Equipment (UE), in the first time slot of the subframe n the downlink control information for the subframe n which relates to PUSCH scheduling, and detecting in the second time slot of the subframe n−1 the downlink control information for the subframe n which relates to PDSCH scheduling;

when the Approach 2 is applied, detecting, by the UE, in the first time slot of the subframe n and the second time slot of the subframe n−1 the downlink control information for the subframe n which relates to PDSCH scheduling, and detecting in the first time slot of the subframe n the downlink control information for the subframe n which relates to PUSCH scheduling; and when the Approach 3 is applied, detecting, by the UE, in the first time slot of the subframe n and the second time slot of the subframe n−1 the downlink control information for the subframe n which relates to PDSCH scheduling, and detecting in the first time slot of the subframe n and the second time slot of the subframe n−1 the downlink control information for the subframe n which relates to PUSCH scheduling.

5. The method according to claim 1, wherein it is configured by signalling whether the downlink control information for the subframe n is transmitted in the subframe n−1; and for a Time Division Duplexing (TDD) system, the subframe n is a downlink subframe, and the subframe n−1 is a last downlink subframe preceding the subframe n.

6. The method according to claim 1, further comprising:

detecting, by the UE, in the first time slot of the subframe n the downlink control information for the subframe n, or detecting, by the UE, in the first time slot and the second time slot of the subframe n the downlink control information for the subframe n.

7. The method according to claim 6, wherein common search space of the UE is located in the first region in the first time slot of the subframe n, or the common search space of the UE is located in the second region in the first time slot of the subframe n, or the common search space of the UE is located in a second time slot of the subframe n−1; and dedicated search space of the UE is located in the first region in the first time slot of the subframe n, or the dedicated search space of the UE is located in the second region in the first time slot of the subframe n, or the dedicated search space of the UE is located in the second time slot of the subframe n and in the second region in the first time slot of the subframe n, or the dedicated search space of the UE is located in the second time slot of the subframe n−1 and in the second region in the first time slot of the subframe n.

8. A system for processing downlink control information, comprising: a base station configured to:

transmit in a subframe n downlink control information for the subframe n, or transmit in a subframe n−1 the downlink control information for the subframe n, wherein n is an integer which is greater than or equal to 0, n and n−1 represent subframe numbers, and the subframe n−1 is a previous subframe immediately adjacent to the subframe n, and when n is equal to 0, the subframe n is a first subframe of a current frame, and the subframe n−1 is the last subframe of a previous frame immediately adjacent to the current frame, and wherein the base station is further configured to:

when the downlink control information for the subframe n is transmitted in the subframe n, transmit in a first time slot and a second time slot of the subframe n the downlink control information for the subframe n, wherein a time-domain position of a region where the downlink control information is transmitted in the second time slot of the subframe n is m consecutive OFDM symbols starting from a h-th OFDM symbol in the second time slot of the subframe n, where h and m are predefined values or h and m are configured by signalling, and m is an integer which is greater than or equal to 1, h is an integer which is greater than or equal to 1, or the time-domain position of the region where the downlink control information is transmitted in the second time slot of the subframe n is from a first OFDM symbol to a last OFDM symbol in the second time slot of the subframe n; and there is one or two regions where the downlink control information is transmitted in the first time slot of the subframe n, and wherein when there is one region where the downlink control information is transmitted in the first time slot of the subframe n, the time-domain position of the region is first A consecutive OFDM symbols in the first time slot of the subframe n, where A is configured by the signalling, which is transmitted on a Physical Control Format Indicator Channel (PCFICH), and A is an integer which is greater than or equal to 1, or the time-domain position of the region is last B consecutive OFDM symbols in the first time slot of the subframe n, where B is configured by the signalling or is a predefined value, and B is an integer which is greater than or equal to 1; and when there are two regions where the downlink control information is transmitted in the first time slot of the subframe n, a time-domain position of the first region is the first A consecutive OFDM symbols in the first time slot of the subframe n, where A is configured by the signalling, which is transmitted on the PCFICH, and A is an integer which is greater than or equal to 1, a time-domain position of the second region is the last B consecutive OFDM symbols in the first time slot of the subframe n, where B is configured by the signalling, or B is a predefined value or B is determined by A, and B and is an integer which is greater than or equal to 1, and a frequency-domain position of the first region is a full bandwidth or a partly consecutive bandwidth, and a frequency-domain position of the second region is configured by the signalling.

9. The system according to claim 8, wherein the base station is configured to:
transmit in a first time slot and/or a second time slot of the subframe n−1 the downlink control information for the subframe n, wherein
a time-domain position of a region where the downlink control information for the subframe n is transmitted in the subframe n−1 is g consecutive Orthogonal Frequency Division Multiplexing (OFDM) symbols in the subframe n−1, where g is configured by signalling or g is a predefined value, and g is an integer which is greater than or equal to 1;
or
transmit in the second time slot of the subframe n the downlink control information for the subframe n, or transmit in a first time slot of the subframe n the downlink control information for the subframe n.

10. The system according to claim 9, wherein the base station is configured to, when the downlink control information for the subframe n is transmitted in the second time slot of the subframe n−1 or when the downlink control information for the subframe n is transmitted in the first time slot of the subframe n, transmit the downlink control information for the subframe n according to at least one of the following transmitting approaches:
Approach 1: transmitting in the second time slot of the subframe n−1 downlink control information for the subframe n which relates to Physical Downlink Shared Channel (PDSCH) scheduling, and transmitting in the first time slot of the subframe n downlink control information for the subframe n which relates to Physical Uplink Shared Channel (PUSCH) scheduling;
Approach 2: transmitting in the second time slot of the subframe n−1 downlink control information for the subframe n which relates to PDSCH scheduling, or transmitting in the first time slot of the subframe n downlink control information for the subframe n which relates to PDSCH scheduling; and
transmitting in the first time slot of the subframe n downlink control information for the subframe n which relates to PUSCH scheduling; and
Approach 3: transmitting in the second time slot of the subframe n−1 downlink control information for the subframe n which relates to PDSCH scheduling, or transmitting in the first time slot of the subframe n downlink control information for the subframe n which relates to PDSCH scheduling; and
transmitting in the second time slot of the subframe n−1 downlink control information for the subframe n which relates to PUSCH scheduling, or transmitting in the first time slot of the subframe n downlink control information for the subframe n which relates to PUSCH scheduling.

11. The system according to claim 10, further comprising:
a User Equipment (UE) configured to:
when the Approach 1 is applied, detect in the first time slot of the subframe n the downlink control information for the subframe n which relates to PUSCH scheduling, and detect in the second time slot of the subframe n−1 the downlink control information for the subframe n which relates to PDSCH scheduling;
when the Approach 2 is applied, detect in the first time slot of the subframe n and the second time slot of the subframe n−1 the downlink control information for the subframe n which relates to PDSCH scheduling, and detect in the first time slot of the subframe n the downlink control information for the subframe n which relates to PUSCH scheduling; and
when the Approach 3 is applied, detect in the first time slot of the subframe n and the second time slot of the subframe n−1 the downlink control information for the subframe n which relates to PDSCH scheduling, and detect in the first time slot of the subframe n and the second time slot of the subframe n−1 the downlink control information for the subframe n which relates to PUSCH scheduling.

12. The system according to claim 8, wherein
it is configured by signalling whether the downlink control information for the subframe n is transmitted in the subframe n−1; and
for a Time Division Duplexing (TDD) system, the subframe n is a downlink subframe, and the subframe n−1 is a last downlink subframe preceding the subframe n.

13. The system according to claim 8, wherein the UE is further configured to:
detect in the first time slot of the subframe n the downlink control information for the subframe n, or
detect in the first time slot and the second time slot of the subframe n the downlink control information for the subframe n.

14. The system according to claim 13, wherein
common search space of the UE is located in the first region in the first time slot of the subframe n, or the common search space of the UE is located in the second region in the first time slot of the subframe n, or the common search space of the UE is located in a second time slot of the subframe n−1; and
dedicated search space of the UE is located in the first region in the first time slot of the subframe n, or the dedicated search space of the UE is located in the second region in the first time slot of the subframe n, or the dedicated search space of the UE is located in the second time slot of the subframe n and in the second region in the first time slot of the subframe n, or the dedicated search space of the UE is located in the second time slot of the subframe n−1 and in the second region in the first time slot of the subframe n.

15. The method according to claim 2, wherein
it is configured by signalling whether the downlink control information for the subframe n is transmitted in the subframe n−1; and
for a Time Division Duplexing (TDD) system, the subframe n is a downlink subframe, and the subframe n−1 is a last downlink subframe preceding the subframe n.

16. The system according to claim 12, wherein
it is configured by signalling whether the downlink control information for the subframe n is transmitted in the subframe n−1; and
for a Time Division Duplexing (TDD) system, the subframe n is a downlink subframe, and the subframe n−1 is a last downlink subframe preceding the subframe n.

* * * * *